Jan. 4, 1966 M. E. CRIFFIELD ETAL 3,227,048
CONTROL SYSTEM
Filed Sept. 26, 1963 2 Sheets-Sheet 2
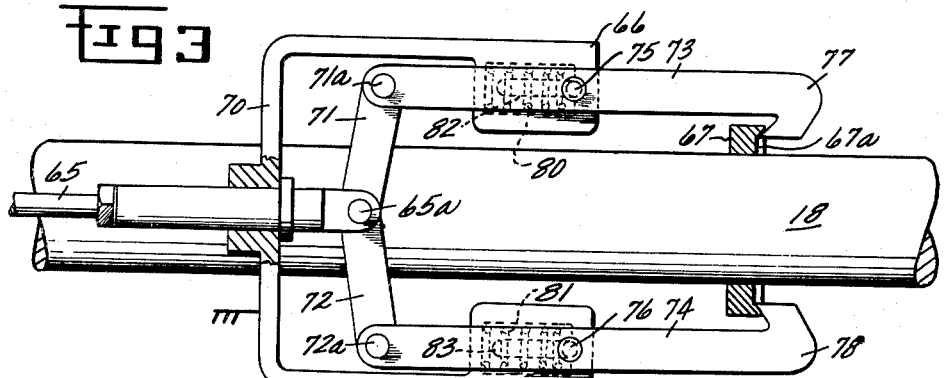
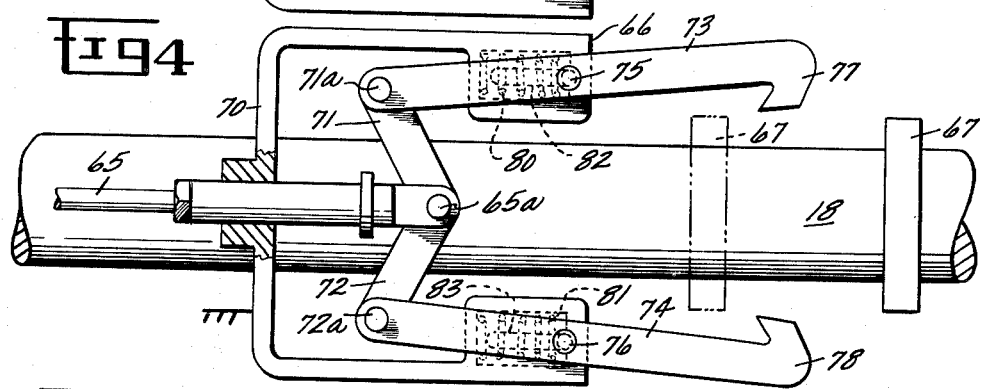
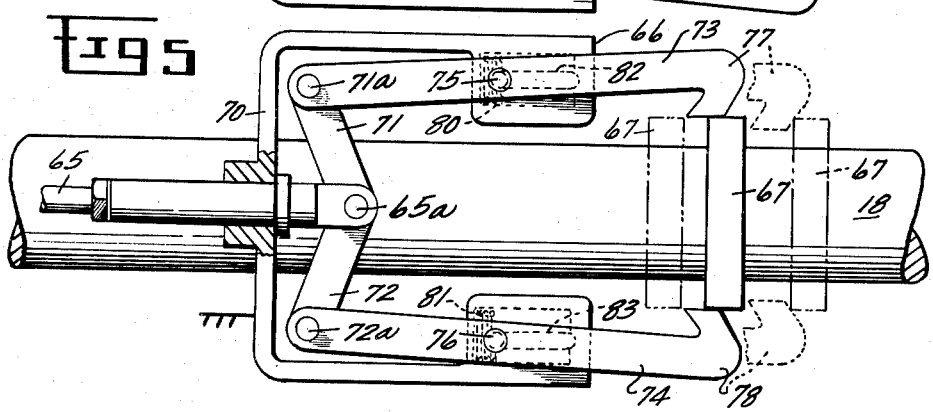
INVENTORS
MELVIN E. CRIFFIELD
WILLIAM K. GULICK
BY
Gerald L. Moore
ATTORNEY 3,227,048
CONTROL SYSTEM
Melvin Eugene Criffield, Cincinnati, and William K. Gulick, Glendale, Ohio, assignors to General Electric Company, a corporation of New York
Filed Sept. 26, 1963, Ser. No. 311,752
10 Claims. (Cl. 91—6)

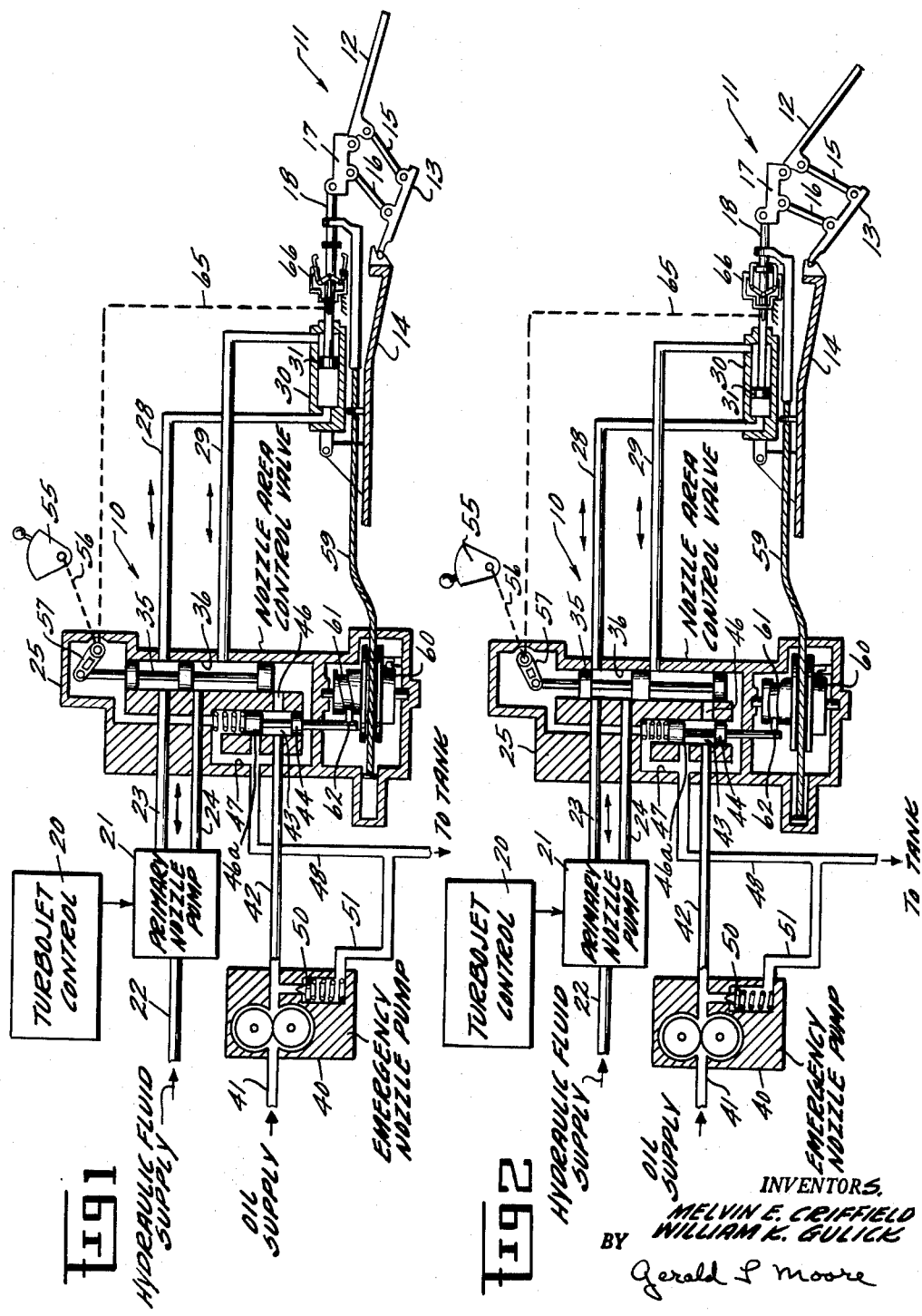

This invention relates to a control system and more particularly to such a system providing for continued operation in event of a partial malfunctioning of the system.

In control systems and particularly in control systems for positioning multiposition mechanisms, it is important to provide coordinated secondary control systems or such reserve systems to function in the event of a malfunction of the primary control system. This is important especially where the multiposition mechanism has an optimum position where, if the mechanism can no longer be actuated to more than one position, it is best positioned for continued operation of the apparatus to which it is associated. Such secondary control systems must function immediately if needed, however because of their character of being used infrequently if at all, they must be relatively inexpensive and function in a manner not interfering with the normal functioning of the primary control system.

Specifically in one application of this invention, turbojets employing an exhaust reheat system commonly referred to as an afterburing system must be provided a variable area exhaust nozzle so that during use of the reheat system the nozzle area may be increased to minimize any change in the pressure ratio at the nozzle and minimize any effects of the operation of the turbojet. Similarly the nozzle must be closed when the afterburning system is not employed. However, in the event of a failure of the actuating forces on such a nozzle most nozzles will normally move to the open position because the funneling or restricted orifice shape of the nozzle allows the gases passing therethrough to exert a high outward force on the walls of the nozzle in a direction to move them radially outward and increase the area of the nozzle opening.

In the event of such a nozzle open failure the thrust of the turbojet is substantially reduced so as to severely affect the operation of the aircraft. This occurs since the pressure ratio across the turbine changes allowing the operating temperature of the turbojet to decrease resulting in a decrease in the thrust of the turbojet. This nozzle area control system provides for any such malfunction of the primary actuating system in a manner that the nozzle will be moved to the closed position and held closed allowing continued operaiton of the aircraft without any substantial adverse effect on or reduction of thrust from the turbojet.

It is accordingly one object of tis invention to provide a control for a multiposition mechanism with actuation means comprising a primary control system for normal positioning of the mechanism through the actuation means, a second control system for actuation of the mechanism to an optimum stable position in event of a malfunction of the first control system, and a holding means for maintaining the mechanism in this stable position upon actuation of the second control means.

It is another object of this invention to provide a control for a turbojet variable area nozzle incorporating a primary control system for normal operation of the variable area nozzle, a second control system for closing the nozzle and maintaining it closed in event of a malfunction of the first control system, and a third control system to lock the nozzle in a closed position.

It is another object of this invention to provide a control system for a turbojet variable area nozzle wherein the primary control system is provided for normal operation of the nozzle and a secondary control system is provided incorporating a hydraulic unit which will act through the nozzle actuating system in event of a malfuction of the first system to move the nozzle to a closed position, with a third system including a nozzle actuator lock to assure that the nozzle remains in the closed position by locking the actuator against subsequent nozzle movement to the open position.

It is a further object of this invention to provide nozzle locking mechanism which permits normal operation of the nozzle actuator and upon its actuation to the closed position, permits the nozzle actuator to remove to the nozzle closed position to be retained in that position by the nozzle lock.

In accordance with one embodiment of the invention there is provided a nozzle area control for a turbojet nozzle comprising a primary control system connected for positioning said nozzle controlling the actuation of a nozzle actuator, a second control system connected to said nozzle actuator for effecting an actuator movement to the nozzle closed position in the event of a malfunction of said primary control system, with a nozzle locking mechanism positioned to be moved to the closed position upon activation of said second control system which will allow the nozzle actuator to move to the nozzle closed position and subsequently prevent the actuator from subsequent movement to the nozzle open position in event of a malfunction of the second control system.

Other objects and many of the attendant advantages of this invention will be readily appreciated as the same becomes better understood by reference to the following detailed description when considered in connection with the accompanying drawings wherein:

FIG. 1 is a schematic of the nozzle area control with a partial view of the turbojet nozzle in cross-section and actuated to the nozzle open position by the primary control system;

FIG. 2 is a schematic of the nozzle area control with a partial view of the turbojet nozzle in cross-section and actuated to the nozzle closed position by the second control system and the nozzle locking mechanism positioned to lock the nozzle in the closed position;

FIG. 3 illsutrates the nozzle locking mechanism and a portion of the nozzle actuator with the nozzle lock in the locked position to prevent the actuator from moving to the nozzle open position;

FIG. 4 illustrates the nozzle locking mechanism moved to the unlocked position as during normal operation of the nozzle control system, and FIG. 5 illustrates the actuator being moved through the closed locking mechanism during control of the nozzle by the second control system.

Referring now primarily to FIGS. 1 and 2 of the drawings there is illustrated schematically a variable area nozzle control 10 for positioning a variable area nozzle 11. A nozzle of the type illustrated here is disclosed in U.S. Patent 2,969,641, Schaefer, which issued January 31, 1961 and is assigned to the same assignee. Briefly described the nozzle consists of flaps 12 and 13 supported from the tail pipe 14 in a manner to form a variable area orifice at the exhaust end of the tail pipe. The nozzle flaps are connected by bell cranks 15 and 16 with the flaps positioned by movement of the connecting member 17 through the rod 18 wherein longitudinal movement of the rod pivots the flaps 12 and 13 to vary the area of the orifice at the end of the tail pipe 14. It can be seen from the nozzle configuration that gas flow through the tail pipe will tend to exert a force upon these flaps to cause them to open, therefore in event of a malfunction resulting in a loss of actuator forces, if the flaps are in other than the open position they will normally be forced open by this gas flow force resulting in a nozzle open failure of the variable area nozzle, this specific control system is directed against that possibility.

Turning now to the primary control system 10 for regulating the position of the nozzle flaps, this system consists of the turbojet control 20 connected to regulate the output of the primary nozzle pump 21 which is a bi-directional flow pump, for instance a wobble-plate pump, having an input line 22 through which hydraulic fluid is supplied with two output lines 23 and 24 connected to the nozzle area control valve 25 whereby the input flow of hydraulic fluid may be conveyed through either of the control lines 28 and 29 leading to the nozzle actuator 30. A multiple spool valve 35 for directing the output flow from the primary nozzle pump 21 is positioned for longitudinal movement within a spool sleeve 36 and when in the position illustrated in FIG. 1, connects the primary nozzle pump 21 through lines 23, 24, 28 and 29 to the nozzle actuator 30. A piston 31 is positioned by this fluid supply and is connected to the rod 18 for longitudinal movement of the rod thereby positioning the control flaps of the variable area nozzle. In this manner the primary nozzle pump under regulation of the turbojet control 20 positions the variable area nozzle in accordance with a signal to the primary nozzle area control system. This signal may be supplied directly from the operator or pilot to the nozzle area control or may come through a turbojet fuel control (not shown) in the more common manner of controlling the nozzle positioning.

A secondary nozzle control system is also interconnected with the nozzle area control valve 25 comprising an emergency nozzle pump 40 supplied with hydraulic fluid through hydraulic line 41 from a hydraulic fluid supply (not shown) to thereafter be conveyed through hydraulic line 42 to the control valve 25. Line 42 leads to a spool valve chamber 43 in which a spool valve 44 is positioned for longitudinal movement. The emergency nozzle pump 40 is preferably continuously driven in a suitable manner and, with the spool valve positioned as in FIG. 1 the pump will supply pressured hydraulic fluid through the line 42 into the spool valve chamber 43 on through the orifice 46 and the spool sleeve 36 to the internal passage 47 and the line 48 for return to a hydraulic fluid supply tank (not shown). In addition, the emergency nozzle pump may, through a pressure relief valve 50, supply fluid directly through the line 51 back to the tank if the pressure is sufficient to open the relief valve 50. In this manner the emergency nozzle pump 40 is operated at all times to provide a continuously operating backup system in the event of a failure of the primary nozzle pump 21, however by circulation of the fluid back to the supply tank no heat energy is added directly to the fluid of the primary nozzle control system.

Assuming that a malfunction of the primary nozzle pump 21 or associated systems occurs, the supply of pressured fluid through the lines 28 and 29 to the nozzle actuator would be interrupted thereby unloading the actuator and allowing the flaps 12 and 13 to move to the nozzle open position under force of the primary gas flow on the flaps as described before. The immediate effect on the aircraft or equipment driven by the turbojet is a reduction in output power or thrust sensed by the operator or pilot assuming that the reheat system is not being utilized, and if the reheat system is being utilized at the time of malfunction when afterburning has ceased the nozzle open failure would be sensed by the pilot by such a reduction of thrust. Accessible to the pilot of the aircraft is a lever 55 which is connected by suitable linkages illustrated by the dotted line 56 to the control link 57 attached to the spool valve 35. Movement of the lever 55 results in a downward movement of the spool valve 35 within the spool sleeve 36 so as to connect together the fluid lines 23 and 24 leading from the primary nozzle pump 21 and allow recirculation of any output fluid from the pump 21. At the same time line 28 is connected to these lines for relief of pressured fluid from the one side of the piston 31. Downward movement of this spool valve 35 also results in directing hydraulic fluid supplied by the emergency nozzle pump 40 through line 42, spool valve chamber 43 and passage 46 to the line 29 wherein pressured fluid is supplied from the pump 40 to the nozzle actuator 30 to force the piston 31 to the left and cause the control rod to move the variable area nozzle flaps 12 and 13 in a direction to reduce the area of the variable area nozzle 11.

Concurrent with the nozzle closing movement of the rod 18 a mechanical feedback cable 59 leading to the nozzle area control valve 25 is moved to rotate the spool 60. A cam follower 62 follows the cam member 61 and is in turn attached to the spool valve 44 and this feedback arrangement, as the nozzle actuator moves to close the variable area nozzle the mechanical feedback cable 59, acts through the spool 60 and the cam 61 to cause an upward movement of the spool valve 44 within the spool valve chamber 43 to allow more and more hydraulic fluid supplied by the emergency nozzle pump 40 through the line 42 to bypass the actuator and pass through orifice 46a and line 48 back to the supply tank. By this arrangement once the nozzle is positioned the excess pressured fluid from the pump 40 is bypassed back to the supply tank and any further movement by the nozzle to an open position will cause the orifice 46a to be closed by movement of the spool valve 44 through the feedback mechanism to allow more pressured fluid to be supplied through the orifice 46 to the line 29 to return the nozzle in the closed position. It can be seen that by providing the emergency nozzle pump 40 for continuous operation with recirculation of hydraulic fluid back to the hydraulic supply tank when not needed for actuation of the nozzle assembly a continuously operating secondary system is provided which may be pilot activated through the control lever 55 to immediately close the nozzle in the event of a primary control system malfunction.

A third control system is also provided which functions in cooperation with the second system and is actuated by the push-pull cable 65, this system comprises a nozzle locking mechanism or lock 66 to be actuated with actuation of the secondary control system by movement of control lever 55. The purpose of the nozzle lock illustrated in enlarged detail in FIGS. 3, 4, and 5 is to clamp around a flange 67 on rod 18 when the nozzle is actuated to the closed position such that in the event the second system allows the nozzle to begin movement toward the open position the nozzle is prevented from further movement by the locking mechanism. The lock consists of a stationary support member 70 attached to a portion of the tail pipe or other member with an actuating cable 65 extending therethrough pivotally linked to connecting members 71 and 72. These connecting members are in turn pivotally connected to the clamping arms 73 and 74 which pivot about the support pins 75 and 76 supported from the member 70. The clamping arms 73 and 74 include clamping heads 77 and 78 respectively which as illustrated in FIG. 3 are shaped to intersect an indented portion 67a of the flange 67 and prevent longitudinal movement of the attached actuator rod 18 in one direction. The indented configuration of the flange is to provide positive engagement of the clamping ends and flange. The pins 75 and 76 are located within the elongated slots 82 and 83 in the support member 70 and are spring loaded to one end of these slots by springs 80 and 81, the purpose of which will be explained later.

When the control rod 65 is positioned as illustrated in FIG. 4 the clamping arms 73 and 74 are so positioned that the flange 67 may move freely without encountering the clamping heads 77 and 78 thereby allowing free longitudinal movement of the control rod and flange as would be necessary when the nozzle is being positioned under action of the primary nozzle control system. However, upon actuation of the control lever 55 wherein the secondary system is activated, the nozzle lock is moved to that position illustrated in FIGURE 3 wherein the rod 65 is actuated to the left in the drawing in a direction away from the support member 70 so as to pivot the connecting members 71 and 72 and cause the arms 73 and 74 to pivot about the support pins 75 and 76 to move the clamping heads 77 and 78 to a predetermined position closer to the actuator rod 18. By reason of the pivot 65a moving to the left past an imaginary line connecting pivots 71a and 72a, an overcenter locking action is provided preventing the clamping heads 77 and 78 from being separated by forces acting on these clamping heads in the direction of their normal movement.

As explained the actuation of the secondary system is effected when a nozzle open malfunction is detected by the pilot, therefore upon actuation of the lever 55 the control rod 18 will ordinarily be positioned longitudinally to the right since the nozzle is open. At this point the flange 67 is positioned to the right of the clamping heads 77 and 78 and will immediately be moved to the left by the action of the secondary control system acting through the emergency nozzle pump 40, provision must therefore be made for allowing the flange 67 to pass between the clamping heads. As shown in FIG. 5 this is accomplished when the flange 67 moves from right to left and contacts the clamping heads pushing them to the left by causing the pivot pins 75 and 76 to move within the slots against the force of springs 80 and 81. This causes the pivots 71a and 72a to move to the left and, since the pivot 65a remains stationary as these pivots move to the left past the overcenter position they must move toward each other by further rotation about pivot 65a causing the clamping arms 73 and 74 to pivot about the pins 75 and 76. The pivoting of the clamping arms will move the clamping heads 77 and 78 apart thereby allowing the flange 67 to move to the inside of the nozzle lock or to the left of the clamping heads 77 and 78. Immediately the springs 80 and 81 return the clamping arms to the position indicated in FIG. 3 with the second system maintaining the actuating rod 18 to its left hand position holding the nozzle in a closed configuration.

Assuming a malfunction of the second control system allowing the pressure within the nozzle actuator 30 to decrease, the actuator rod will again attempt to move to the right under action of the primary gas stream acting against the flaps 12 and 13. However, movement of the actuator rod will cause the flange 67 to contact the clamping heads 77 and 78 which interfit within the indentation 67a of the flange thereby preventing any further movement of the actuator rod 18 to the right or to the nozzle open position. In this manner the nozzle is locked in the closed position until lever 55 is returned to the original normal operating position illustrated in FIG. 1.

As herein described there is incorporated in this nozzle area control a primary control system for normal operation and positioning of the variable area nozzle 11, with a coordinated second control system including an emergency nozzle area pump 40 for immediate return of the nozzle to the closed position upon actuation of the lever 55 by the pilot, and a third system incorporating the nozzle lock 66 which is actuated to a closed position by actuation of the lever 55 so that once closed, the nozzle may not return to the open position even though the primary and second systems may subsequently malfunction.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. In combination with a multiposition mechanism, an actuator therefor and energizing means for the actuator,
 a primary control means for controlling the energization of said actuator for positioning said mechanism,
 a second control means for controlling the energization of said actuator,
 said second control means operable to control said actuator to position said mechanism in one predetermined position only,
 locking means interacting with said second control means to hold said mechanism in said one predetermined position,
 whereby if said primary control means malfunctions, said second control system may be activated to position said mechanism.

2. In combination with a multiposition mechanism, an actuator therefor and energizing means for the actuator,
 a primary control means for controlling the energization of said actuator for positioning said mechanism,
 a second control means for controlling the energization of said actuator,
 said second control means operable to control the energization of said actuator to position said mechanism in one predetermined position only,
 means to activate said second control means and deactivate said primary control means,
 and locking means interacting with said second control means to hold said mechanism in said one predetermined position.

3. In combination with a multiposition mechanism, an actuator therefor and energizing means for the actuator,
 a primary control means for controlling the energization of said actuator for positioning said mechanism,
 a second control means for controlling the energization of said actuator,
 said second control means operable to control the energization of said actuator to position said mechanism in one predetermined position only,
 locking means operable to hold said mechanism in said one predetermined position,
 means to activate said second control means and said locking means and deactivate said primary control means concurrently in event of a malfunction of said primary control means.

4. In combination with a multiposition mechanism, an actuator therefor and energization means for the actuator,
 a primary control means for controlling the energization of said actuator for positioning said mechanism,
 a second control means for controlling the energization of said actuator,
 said second control means operable to move said mechanism to and maintain said mechanism in a predetermined stationary position by controlling of said actuator,
 a third control system operable to maintain said mechanism in said predetermined stationary position,
 means to concurrently inactivate said primary control means and activate said second and third control means in event of a malfunction of said primary control means.

5. In combination with a multiposition mechanism, an actuator therefor and energization means for the actuator,
 a primary control means for controlling the energization of said actuator for positioning said mechanism,
 a second control means for controlling the energization of said actuator,
 said second control means operable to move said mechanism to and maintain said mechanism in a predetermined stationary position by actuation of said actuator,
 a locking mechanism operable to maintain said mechanism is said predetermined stationary position when activated, and
 means to concurrently inactivate said primary control means and activate said second control means and said locking mechanism in event of a malfunction of said primary control means.

6. In combination with a multiposition mechanism, an actuator therefor and energizing fluid supply means for said actuator,
   a primary control means for controlling the flow of energizing fluid to said actuator for controlling the positioning of said mechanism,
   a secondary control means for controlling the flow of energizing fluid to said actuator operable to move said actuator to and maintain said actuator in a predetermined stationary position,
   a locking mechanism operable to hold said actuator when in said predetermined position,
   and means to deactivate said primary control means and activate said secondary control means and said locking mechanism if said primary control means malfunctions.

7. A control for a movable mechanism comprising,
   an actuator coupled to said mechanism for positioning said mechanism,
   an energizing fluid supply means connected for driving said actuator,
   a first valve means for controlling the flow of energizing fluid to said actuator,
   an actuating means for said first valve means,
   a second valve means for controlling the flow of energizing fluid to said actuator in a manner to drive said actuator to a predetermined stationary position,
   a locking means operable to engage and maintain said actuator in said predetermined position,
   means to concurrently actuate said second valve and locking means and inactivate said first valve actuating means.

8. In a turbojet engine having a variable area nozzle, a control system comprising,
   actuating means connected for positioning said nozzle,
   a first energizig fluid supply means connected for driving said actuator,
   a first valve means for controlling the flow of said first energizing fluid to said actuator,
   a second energizing fluid supply means connected for driving said actuator,
   a second valve means for controlling the flow of said second energizing fluid flow to said actuator in a manner to drive said actuator to a predetermined stationary position,
   means to actuate said first and second valve means,
   said first and second valve means also being operable to recirculate said energizing fluid flow back to its supply means,
   said first valve means being normally actuated to allow fluid flow to said actuator with said second valve means being normally actuated to recirculate fluid back to the supply means.
   a locking mechanism operable to engage said actuator and hold it in said predetermined stationary position,
   and means to concurrently actuate said first valve means to recirculate said energizing fluid flow to said supply means actuate said second valve means to allow said second energizing fluid flow to drive said actuator to said predetermined position, and cause said locking mechanism to engage said actuator.

9. In a turbojet engine having a variable area nozzle, a control system comprising,
   actuating means connected for moving said nozzle,
   an energizing fluid supply means for driving said actuator,
   a first valve means for controlling the flow of energizing fluid flow to said actuator,
   a second valve means for controlling the flow of said energizing fluid flow to said actuator in a manner to drive said actuator to a predetermined stationary position,
   means to actuate said first and second valve means,
   said first and second valve means being operable to recirculate said energizing fluid flow back to the supply means,
   a locking mechanism operable to engage said actuator and hold it in said predetermined stationary position,
   whereby said actuating means is normally controlled by said first valve means, said second valve means is normally operated to recirculate energizing fluid back to the supply means and said locking mechanism is operated to not engage said actuator,
   and means to actuate said first valve means to recirculate said energizing fluid flow to said supply means, actuate said second valve means to allow said second energizing fluid flow to drive said actuator to said predetermined position and engage said locking mechanism with said actuator.

10. In a turbojet engine having a variable area nozzle, a nozzle activating control comprising,
   a hydraulic actuator connected for actuating said nozzle,
   a first hydraulic fluid supply means connected to move said actuator,
   a first control for regulating the first hydraulic fluid supplied to said actuator comprising a first valve,
   said first valve having a first position allowing hydraulic fluid flow to said actuator and a second position recirculating fluid to said supply means,
   a second hydraulic fluid supply means connected to actuate said actuator,
   a second control for regulating said second hydraulic fluid supplied to said actuator including a second valve,
   said second valve having a first position recirculating fluid to said supply means and a second position allowing fluid flow to said actuator to drive said actuator to a predetermined stationary position,
   a two position locking means having a first position for engaging and holding said actuator in said predetermined position and a second position of disengagement with said actuator,
   whereby during normal operation of said control said first and second valve means are actuated to said first positions and said locking means is actuated to said second position, and
   means to concurrently actuate said first and second valve means to said second positions and said locking means to said first position.

References Cited by the Examiner
UNITED STATES PATENTS
3,056,256   10/1962   Torell _____ 60—35.6

SAMUEL LEVINE, *Primary Examiner.*
FRED E. ENGELTHALER, *Examiner.*